F. F. STORY.
NOTE SHEET GUIDING DEVICE.
APPLICATION FILED OCT. 19, 1914.
1,148,724.
Patented Aug. 3, 1915.
2 SHEETS—SHEET 1.
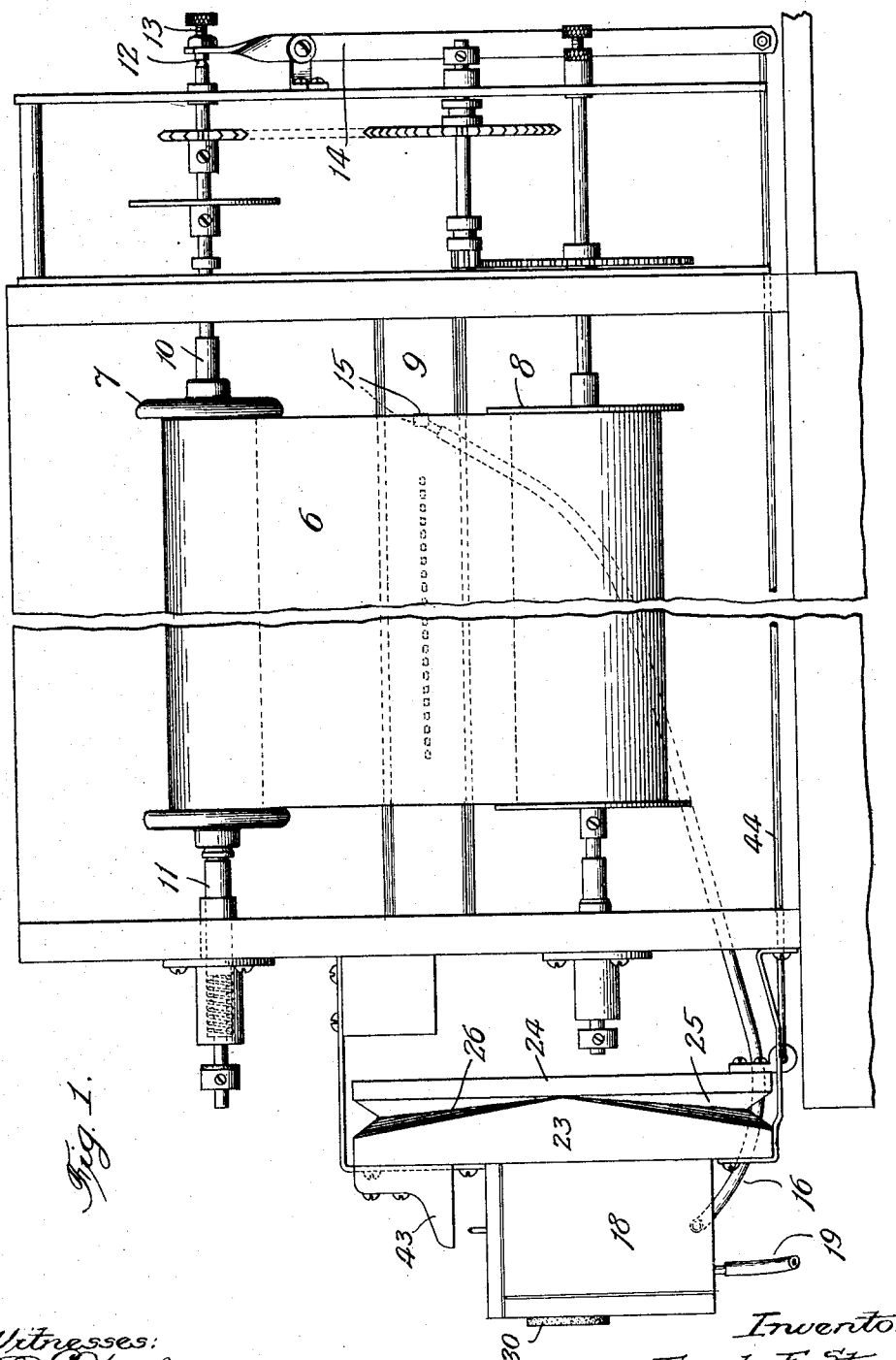

F. F. STORY.
NOTE SHEET GUIDING DEVICE.
APPLICATION FILED OCT. 19, 1914.
1,148,724.
Patented Aug. 3, 1915.
2 SHEETS—SHEET 2.
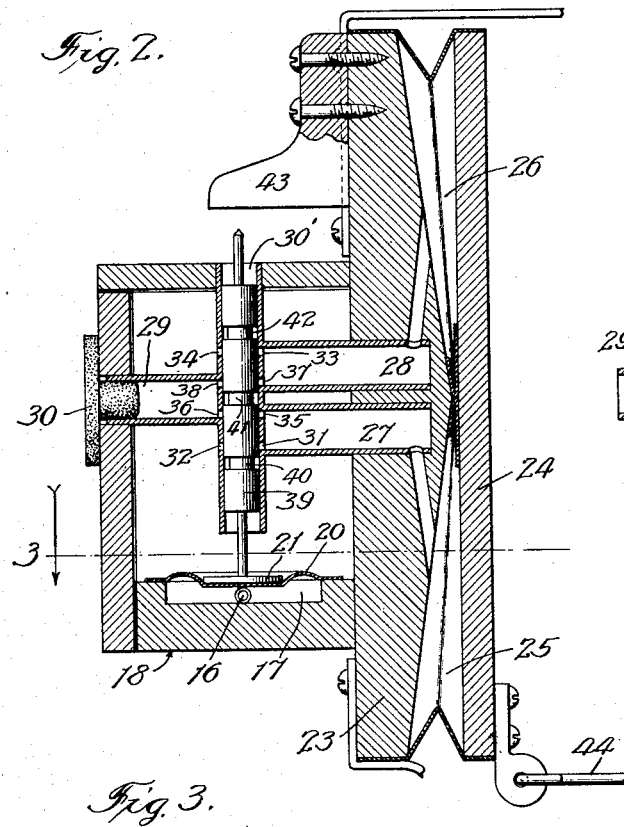
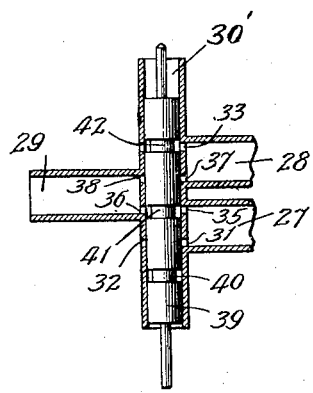
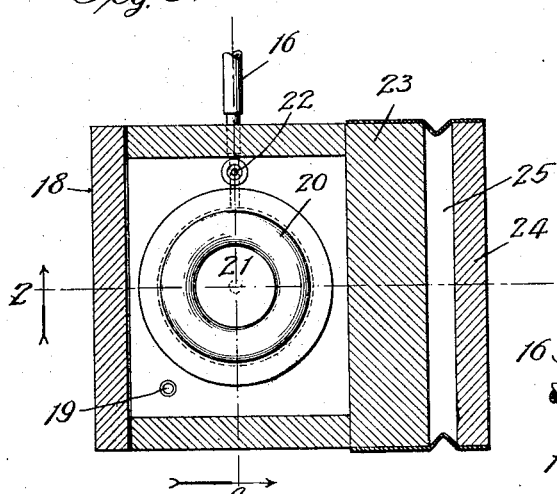
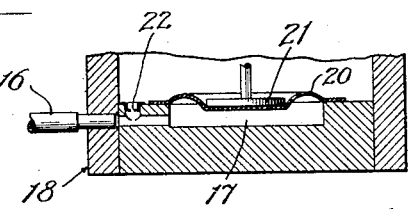
Inventor:
Frank F. Story,

UNITED STATES PATENT OFFICE.

FRANK F. STORY, OF RIVERSIDE, ILLINOIS, ASSIGNOR TO STORY & CLARK PIANO COMPANY, OF CHICAGO, ILLINOIS, A CORPORATION OF ILLINOIS.

NOTE-SHEET-GUIDING DEVICE.

1,148,724.   Specification of Letters Patent.   Patented Aug. 3, 1915.

Application filed October 19, 1914. Serial No. 867,463.

*To all whom it may concern:*

Be it known that I, FRANK F. STORY, a citizen of the United States, residing at Riverside, in the county of Cook and State of Illinois, have invented a new and useful Improvement in Note-Sheet-Guiding Devices, of which the following is a specification.

My invention relates to certain new and useful improvements in note-sheet guiding-devices and is fully described and explained in the specification and shown in the accompanying drawings, in which:

Figure 1 is an elevation of my note-sheet guiding-device; Fig. 2 is a longitudinal section through the pneumatics and their operating mechanism, on the line 2 of Fig. 3; Fig. 3 is a horizontal section on the line 3 of Fig. 2; Fig. 4 is a transverse section on the line 4 of Fig. 3, and Fig. 5 is a view of certain of the parts shown in Fig. 2 with the valve in a different position.

Referring to the drawings, 6 is a note sheet, 7 is the spool from which the same is wound onto a receiving spool 8, and 9 is the tracker-bar over which the note sheet passes. The spool 7 is mounted between a live spindle 10 and a dead spindle 11, the latter being spring-pressed toward the live spindle in accordance with common practice. The live spindle is capable of a limited longitudinal movement in its bearings, which movement is limited by the engagement of a pointed end 12 with an adjustable screw 13 mounted on a lever 14 of the first order.

It will be evident that by moving the lever 14, the spool 7 can be moved longitudinally, the dead spindle 11 yielding for this purpose.

The tracker-bar is provided with a guide-opening 15, which, when the sheet is in proper position, just slightly underlaps the edge of the sheet, so that a limited amount of air will pass around the edge of the sheet into this opening. In the drawing, I have shown this underlapping as quite distinctly visible, but, in practice, the edge of note sheet is usually found to be turned up slightly, so that a limited leakage will occur into the guide-opening 15 without the perforation itself being directly visible from the front. In any event, however, when the note sheet is in exactly the proper position, the outer edge of the guide-opening will be slightly exposed.

The guide-opening is connected by a tube 16 with a pouch 17 in the lower part of a box 18 to the interior of which suction is applied by a pipe 19. The pouch is of ordinary construction, such as is commonly used in the art, consisting merely of a cylindrical hollow cut in the vacuum box 18 and a flexible leather diaphragm 20 at the center of which is a plate 21. A small perforation 22 connects the pouch with the interior of the vacuum box for bleeding the pouch.

On one side of the box is a plate 23 beveled back from its center, and to the center is pivotally secured a plate 24 forming, with the ends of the plate 23, the relatively movable sides of two pneumatics 25 and 26 which have communication with pipes 27 and 28 extending into but having no direct connection with the interior of the vacuum box.

29 is a pipe entering the vacuum box 25 and having communication with the atmosphere, a felt plug 30 being mounted in the end of this pipe to deaden the sound caused by the passage of air. This plug, however, does not interfere with the free entry of air through the pipe 29.

30' is a vertical pipe open above to the atmosphere and attached to the three pipes 27, 28 and 29. This pipe is traversed by eight perforations arranged in diametrically opposing pairs. The perforations 31 and 32 open, respectively, into the pipe 27 and the interior of the vacuum box, the perforations 33 and 34 being similarly placed with respect to the pipe 28. The perforations 35 and 36 open, respectively, into the pipe 27 and the pipe 29, while the perforations 37 and 38 are similarly placed with reference to the pipe 28.

Within the vertical pipe 30' is a vertically movable valve 39 having three grooves, 40, 41 and 42, so spaced that when the valve is in its normal position with its central groove 41 opposite the center of the pipe 29 and between the perforations 36 and 38 opening into the same, the grooves 40 and 42 are, respectively, below and above the pairs of perforations 31, 32 and 33, 34. The lower end of the valve rests on the plate 21 of the pouch and the upward movement of the valve is limited by a stop 43.

The plate 24, forming part of the two pneumatics, is connected by a link 44 with the lower end of the lever 14, so that movement of this plate can shift the spool 7.

The structure of the preferred arrangement having now been explained, it is believed its operation can be understood. The plate 24 and lever 14, being connected together on corresponding sides of their centers, oscillate on their pivots in the same general direction and thus the spool 7 moves at all times in the same direction with the upper end of the plate 24. Therefore, inflation of the pneumatic 26 and deflation of the pneumatic 25 shifts the spool to the right or in a direction to cover the guide-opening 15 in the tracker-bar, while inflation of the pneumatic 25 and deflation of the pneumatic 26 moves the spool in an opposite direction to uncover the guide-opening 15. When the spool is in exactly the proper position and exactly the normal leakage is occurring into the guide-opening 15, the pouch is partially inflated, as shown in Fig. 2, the air entering the guide-opening 15 at just the speed at which it escapes from the pouch, or the communication therewith through the opening 22 provided to bleed the pouch. Under these conditions, both the pneumatics will be partially inflated, as shown in Fig. 2, and the valve will be in mid-position where the pneumatics are entirely cut off from everything. If, now, the roll is irregularly wound, so as to cover the guide-opening 15 to a greater extent, that is, if the paper in its movement takes a position farther to the right than is proper, the entry of air into the guide-opening is throttled or stopped, the pressure within the pouch instantly falls, by reason of air passing therefrom through the opening 22, and the valve falls with it to the position shown in Fig. 5, in which the upper two grooves of the valve come into registration with the pairs of openings 33, 34 and 35, 36, thereby connecting the upper pneumatic 26 through the pipe 28, perforation 33, groove 42 and perforation 34 with the interior of the vacuum box and connecting the lower pneumatic 25 through the pipe 27, perforation 35, groove 41, perforation 36 and pipe 29 with the atmosphere. The upper pneumatic 26 is thus deflated and the lower pneumatic 25 inflated, so as to move the spool to the left. This movement will occur until the guide-opening is sufficiently uncovered to bring the valve again to normal position. If, from similar causes, the paper recedes to the left, so as to uncover an abnormal amount of the guide-opening 15, the air entering the pouch will be greater than can be taken care of by the opening 22 and the pressure within will rise forcing the valve up above its normal position. In this case the two lower grooves 40 and 41 of the valve will be effective, the groove 40 connecting perforations 31 and 32, thereby opening communication between the lower pneumatic 25 and the interior of the vacuum box, and the groove 41 connecting perforations 37 and 38, so as to connect the pneumatic 26 with the atmosphere, whereby the upper pneumatic is inflated and the lower one deflated.

It will be understood by those skilled in the art that in any note-sheet guiding-mechanism, the important point is to maintain the proper relative position between the note sheet and tracker-bar. Various expedients have been adopted for this purpose, some of which operate by shifting the tracker-bar and others by shifting the note sheet. I prefer to shift the note sheet in the manner indicated, but it will be understood that the important point is merely obtaining relative movement. The mechanism which I have provided for securing this relative movement is, however, exceedingly simple and desirable for several reasons. In the first place, it operates with a single guide-opening in the tracker-bar, and, secondly, the mechanism is positive and effective in its operation and can be made of relatively small size and of exceedingly simple construction.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

What I claim as new and desire to secure by Letters Patent, is:

1. A note-sheet guiding-device including, in combination, a tracker-bar, means for feeding a note-sheet across the tracker-bar, a guide-opening which the note-sheet partially covers in its normal position, two pneumatics respectively arranged to move the note-sheet feeding means and the tracker-bar relatively in opposite directions when correspondingly actuated, a valve arranged to cause the operation of one pneumatic when moved in one direction from its normal position, and the operation of the other pneumatic when moved in the other direction from the normal position, and a valve-operating device having pneumatic connection with the guide-opening to hold the valve in its normal position or cause its movement in either direction therefrom, according to the amount which said guide-opening is exposed by the note-sheet.

2. A note-sheet guiding-device including, in combination, a tracker-bar, means for feeding a note-sheet across the tracker-bar, a guide-opening which the note-sheet partially covers in its normal position, a single movable member arranged to move the note-sheet feeding means and the tracker-bar relatively to each other in opposite directions, two pneumatics connected to said member to move the same in opposite directions when respectively actuated, a valve arranged to cause the operation of one pneumatic when moved in one direction from its normal position, and the operation of the other pneumatic when moved in the other direction from the normal position, and a valve-operating device having pneumatic connection with the guide-opening to hold the valve in its normal position or cause its movement in either direction therefrom, according to the amount which said guide-opening is exposed by the note-sheet.

3. A note-sheet guiding-device including, in combination, a tracker-bar, means for feeding a note-sheet across the tracker-bar, a guide-opening which the note-sheet partially covers in its normal position, a single pivoted member arranged to move the note-sheet feeding means and the tracker-bar relatively, two pneumatics on opposite sides of the pivot of said member to move the same in opposite directions, a valve arranged to cause the operation of one pneumatic when moved in one direction from its normal position, and the operation of the other pneumatic when moved in the other direction from the normal position, and a valve-operating device having pneumatic connection with the guide-opening to hold the valve in its normal position or cause its movement in either direction therefrom, according to the amount which said guide-opening is exposed by the note-sheet.

4. A note-sheet guiding-device including, in combination, a tracker-bar, means for feeding a note-sheet across the tracker-bar, a guide-opening which the note-sheet partially covers in its normal position, two members, one of which has two faces meeting at an obtuse angle, the two members being mutually pivoted at said angle, means inclosing the sides of the spaces between said members on the opposite sides of the pivot thereof to form two pneumatics, one of said members having connections to move the tracker-bar and note-sheet feeding means relatively, a valve arranged to cause the operation of one pneumatic when moved in one direction from its normal position, and the operation of the other pneumatic when moved in the other direction from the normal position, and a valve-operating device having pneumatic connection with the guide-opening to hold the valve in its normal position or cause its movement in either direction therefrom, according to the amount which said guide-opening is exposed by the note-sheet.

5. A note-sheet guiding-device including, in combination, a tracker-bar, means for feeding a note-sheet across the tracker-bar, a guide-opening which the note-sheet partially covers in its normal position, two pneumatics respectively arranged to move the note-sheet feeding means and the tracker-bar relatively in opposite directions when correspondingly actuated, a vacuum chamber, a valve arranged when moved in one direction from its normal position to connect one pneumatic with the vacuum chamber and the other with the atmosphere and when moved in the opposite direction from the normal position to connect the other pneumatic with the vacuum chamber and the first with the atmosphere, and a valve-operating device having pneumatic connection with the guide-opening to hold the valve in its normal position or cause its movement in either direction therefrom, according to the amount which said guide-opening is exposed by the note-sheet.

6. A note-sheet guiding-device including, in combination, a tracker-bar, means for feeding a note-sheet across the tracker-bar, a guide-opening which the note-sheet partially covers in its normal position, two pneumatics respectively arranged to move the note-sheet feeding means and the tracker-bar relatively in opposite directions when correspondingly actuated, a vacuum chamber, a tube extending at one end through one side thereof to be exposed to atmospheric pressure and at the other end open to the interior of the chamber, communications opening into the tube from the atmosphere, the two pneumatics and the interior of the vacuum box, a valve in the tube and exposed at its upper end to the atmosphere and at its lower end to the vacuum and controlling the communications between said tube and the interior of the vacuum box, the atmosphere and the pneumatics and arranged, when moved in one direction from its normal position, to connect the communications between the vacuum box and one pneumatic and between the other vacuum box and the atmosphere, and, when moved in the opposite direction, to connect the communications between the other pneumatic and the interior of the vacuum box and between the first pneumatic and the atmosphere, a pneumatically expansible member arranged to move the valve and having its interior connected to the guide-opening and its exterior exposed to the vacuum in the vacuum box.

In testimony whereof I have hereunto set my hand this 16th day of October, 1914.

FRANK F. STORY.

In presence of two subscribing witnesses:
L. HEISLAR,
A. C. FISCHER.

Copies of this patent may be obtained for five cents each, by addressing the "Commissioner of Patents, Washington, D. C."